(12) United States Patent
Ha et al.

(10) Patent No.: US 11,882,431 B2
(45) Date of Patent: *Jan. 23, 2024

(54) NETWORK SYSTEM OF HOME APPLIANCE AND NETWORK SETUP METHOD OF THE SAME

(71) Applicant: Samsung Electronics Co., Ltd., Suwon-si (KR)

(72) Inventors: Chang Ho Ha, Suwon-si (KR); Bo Kyu Won, Suwon-si (KR); Mo Weon Lee, Seoul (KR); Seong Ho Cho, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/084,865

(22) Filed: Dec. 20, 2022

(65) Prior Publication Data

US 2023/0123379 A1    Apr. 20, 2023

Related U.S. Application Data

(63) Continuation of application No. 17/559,375, filed on Dec. 22, 2021, which is a continuation of application
(Continued)

(30) Foreign Application Priority Data

Dec. 28, 2011  (KR) ........................ 10-2011-0144726

(51) Int. Cl.
*G06F 15/16*      (2006.01)
*H04W 76/10*    (2018.01)
(Continued)

(52) U.S. Cl.
CPC ......... *H04W 76/10* (2018.02); *H04L 12/2807* (2013.01); *H04L 12/2821* (2013.01);
(Continued)

(58) Field of Classification Search
CPC ..... H04W 12/08; H04W 76/14; H04W 76/10; H04W 12/50; H04W 12/06; H04W 48/20;
(Continued)

(56) References Cited

U.S. PATENT DOCUMENTS 7,178,349 B2    2/2007  Roh et al.
7,720,018 B2    5/2010  Hassan
(Continued)

FOREIGN PATENT DOCUMENTS

CN          1553656 A      12/2004
CN          1640057 A       7/2005
(Continued)

OTHER PUBLICATIONS

Near Field Communication Network Services Jorma Ylinen;Mikko Koskela; Lari Iso-Anttila; 2009 Third International Conference on Digital Society Year: 2009 | Conference Paper | Publisher: IEEE (Year: 2009) (Year: 2009).*
(Continued)

*Primary Examiner* — Oscar A Louie
*Assistant Examiner* — Oluwatosin M Gidado
(74) *Attorney, Agent, or Firm* — STAAS & HALSEY LLP

(57) ABSTRACT

A home appliance comprises a communication circuitry, an input unit configured to receive an input for controlling the home appliance, and at least one processor configured to control the communication circuitry to operate in the first mode in response to detecting the button being pressed, establish a first communication interface with an external terminal, obtain, via the first communication interface, net-
(Continued)

work set-up information including a Service Set Identifier (SSID) of an external wireless access point apparatus and authentication information to access the external wireless access point apparatus. The SSID is selected via the external terminal and the authentication information was previously stored in the external terminal, control the communication circuitry to operate in the second mode, establish a second communication interface with the external wireless access point apparatus using the obtained network set-up information, and control the communication circuitry to access an external server via the second communication interface.

13 Claims, 6 Drawing Sheets

Related U.S. Application Data

No. 17/365,406, filed on Jul. 1, 2021, now Pat. No. 11,412,557, which is a continuation of application No. 16/701,572, filed on Dec. 3, 2019, now Pat. No. 11,140,727, which is a continuation of application No. 13/729,604, filed on Dec. 28, 2012, now Pat. No. 11,219,072.

(51) Int. Cl.
 *H04L 12/28* (2006.01)
 *H04W 12/06* (2021.01)
 *H04W 12/08* (2021.01)
 *H04W 12/50* (2021.01)
 *H04W 48/20* (2009.01)
 *H04W 76/14* (2018.01)

(52) U.S. Cl.
 CPC .......... *H04W 12/06* (2013.01); *H04W 12/08* (2013.01); *H04W 12/50* (2021.01); *H04L 2012/285* (2013.01); *H04L 2012/2841* (2013.01); *H04W 48/20* (2013.01); *H04W 76/14* (2018.02)

(58) Field of Classification Search
 CPC ............. H04L 12/2807; H04L 12/2821; H04L 2012/2841; H04L 2012/285
 USPC ........................................................ 709/227
 See application file for complete search history.

(56) References Cited

U.S. PATENT DOCUMENTS

| 7,940,732 | B2 | 5/2011 | Lowry et al. |
| 8,102,901 | B2 | 1/2012 | Aissi |
| 2005/0044421 | A1 | 2/2005 | Cho |
| 2006/0238335 | A1 | 10/2006 | Karaoguz et al. |
| 2006/0251256 | A1 | 11/2006 | Asokan |
| 2007/0055998 | A1 | 3/2007 | Kang |
| 2007/0086394 | A1 | 4/2007 | Yamada et al. |
| 2008/0175187 | A1 | 7/2008 | Lowry et al. |
| 2009/0043998 | A1 | 2/2009 | Doumuki |
| 2009/0227282 | A1 | 9/2009 | Miyabayashi et al. |
| 2010/0115262 | A1 | 5/2010 | Suyama et al. |
| 2010/0165879 | A1 | 7/2010 | Gupta et al. |
| 2010/0180019 | A1 | 7/2010 | Elston et al. |
| 2010/0205655 | A1 | 8/2010 | Mokuya |
| 2010/0299417 | A1 | 11/2010 | Austin et al. |
| 2011/0202910 | A1 | 8/2011 | Venkatakrishnan et al. |
| 2011/0264730 | A1 | 10/2011 | Dattagupta |
| 2011/0319016 | A1 | 12/2011 | Gormley |
| 2012/0008529 | A1 | 1/2012 | Averbuch |
| 2012/0099566 | A1 | 4/2012 | Laine et al. |
| 2012/0163735 | A1 | 6/2012 | Kiyoshige |
| 2012/0265913 | A1 | 10/2012 | Suumäki et al. |
| 2013/0036231 | A1* | 2/2013 | Suumaki ............... H04W 12/04 709/228 |
| 2013/0039352 | A1 | 2/2013 | Ruster et al. |
| 2013/0089001 | A1 | 4/2013 | Dattagupta |
| 2013/0185813 | A1 | 7/2013 | Shim et al. |
| 2015/0327304 | A1 | 11/2015 | Peerapol |
| 2017/0039782 | A1 | 2/2017 | Moeller |

FOREIGN PATENT DOCUMENTS

| CN | 1725685 A | 1/2006 | |
| DE | 10-2004-002241 | 8/2005 | |
| EP | 1309127 | 1/2007 | |
| EP | 2093665 A1 | 8/2009 | |
| EP | 2285163 | 2/2011 | |
| EP | 2611079 | 7/2013 | |
| EP | 2737660 | 10/2018 | |
| EP | 3358787 | 3/2019 | |
| KR | 10-2009-0045556 | 5/2009 | |
| WO | 2016/106393 A2 | 10/2006 | |
| WO | WO 2008/10399 A2 | 8/2008 | |
| WO | WO-2010107125 A1 * | 9/2010 | ........... G06F 3/1222 |
| WO | WO 2012/150526 A2 | 11/2012 | |
| WO | 2013/015656 | 1/2013 | |
| WO | 2013/035043 A1 | 6/2013 | |

OTHER PUBLICATIONS

Notice of Allowance for U.S. Patent Application No. 13/729,604 dated Aug. 31, 2021.
Chirrareddy Sai Sankeerth Reddy, et al., Appliance Automation using LiFi with MQTT in Hybrid Star & Tree Network Setup, IEEE Xplore, 2018.
U.S. Office Action for U.S. Patent Application No. 13/729,604 dated Jun. 23, 2021.
European Communication dated Feb. 8, 2021 in European Patent Application No. 18164354.5.
European Communication dated Feb. 8, 2021 in European Patent Application No. 12199442.0.
Koon-Seok Lee et al., "Network Configuration Technique for Home Appliances", WPM P-1.02, 2002 IEEE (2 pp.).
European Communication dated Mar. 20, 2020 in European Patent Application No. 12199442.0.
European Communication dated Mar. 23, 2020 in European Patent Application No. 12199442.0.
European Communication of a Notice of Opposition date Dec. 12, 2019 in European Patent Application No. 18164354.5.
Wilipedia: "Wi-Fi Protected Setup", Nov. 16, 2011, 16 pages.
Dimitrios D. Vergados, "Service personalization for assistive living in a mobile ambient healthcare-networked environment" Personal and Ubiquitous Computing, Springer Verlag, LO, vol. 14, No. 6, Mar. 2010, pp. 575-590.
European Search Report dated Apr. 5, 2013 in corresponding European Patent Application 12199442.0.
Wikipedia: "Wi-Fi Direct-from Wikipedia, the free encyclopedia", Nov. 30, 2011, pp. 1-4.
European Patent Office and Response issued an Office Action and Response in European Application No. 18164354.5 dated Oct. 1, 2021.
European Office Action dated Jul. 21, 2014 in corresponding European Patent Application 12 199 442.0-1862.
Korean Office Action dated Jun. 21, 2017 in corresponding Korean Patent Application No. 10-2011-0144726.
Chinese Office Action dated Apr. 6, 2017 in related Chinese Patent Application No. 201210579819.9.
European Communication dated Oct. 6, 2017 in European Patent Application No. 12199442.0.
Korean Notice of Allowance dated Dec. 26, 2017 in Korean Patent Application No. 10-2011-0144726.
Chinese Office Action dated Jan. 3, 2018 in Chinese Patent Application No. 201210579819.9.
Chinese Office Action dated May 31, 2018 in Chinese Patent Application No. 201210579819.9.

(56) References Cited

OTHER PUBLICATIONS

Extended European Search Report dated May 4, 2018 in European Patent Application No. 18164354.5.
European Communication under Rule 71(3) EPC dated Oct. 8, 2018 in European Patent Application No. 18164354.5.
Chinese Office Action dated Oct. 9, 2018 in Chinese Patent Application No. 201210579819.9.
European Communication of a Notice of Opposition dated Dec. 14, 2018 in European Patent Application No. 12199442.0.
European Decision to Grant dated Feb. 7, 2019 in European Patent Application No. 18164354.5.
Chinese Notice of Allowance dated Feb. 20, 2019 in Chinese Patent Application No. 201210579819.9 Partial.
U.S. Notice of Panel Decision from Pre-Appeal Brief Review dated Jul. 23, 2018 in U.S. Appl. No. 13/729,604.
U.S. Office Action dated Nov. 8, 2017 in U.S. Appl. No. 13/729,604.
Asokan N. et al., "Visitor Access Management in Personal Wireless Networks", Seventh IEE International Symposium on Multimedia, Irvine, CA, USA, Dec. 12-14, 2005, Picataway, NJ, USA, IEE Dec. 12, 2005, pp. 686.694.
U.S. Office Action dated Apr. 6, 2017 in U.S. Appl. No. 13/729,604.
U.S. Office Action dated Dec. 13, 2016 in U.S. Appl. No. 13/729,604.
U.S. Office Action dated Apr. 8, 2016 in U.S. Appl. No. 13/729,604.
U.S. Office Action dated Sep. 11, 2015 in U.S. Appl. No. 13/729,604.
U.S. Office Action dated May 22, 2015 in U.S. Appl. No. 13/729,604.
U.S. Office Action dated Nov. 5, 2014 in U.S. Appl. No. 13/729,604.
European Summons to Attend Oral Proceedings dated Jul. 29, 2019 in European Patent Application No. 12199442.0.
Bowers & Wilkins, "ZeppelinAir AirPlay wireless set up", XP055541910, retrieved from the internet Nov. 2011, 7 pages.
IT-Techblog, Hightech, KI, IOT, Cloud & Co., "A little handicraft work: mobile sound quality with Zeppelin Air and iPhone", XP055541925, Nov. 2011, 9 pages.
Ray Aguilera, "Zeppelin Air Review", Mac Life, May 2011, 2 pages.
U.S. Office Action dated Aug. 1, 2019 in U.S. Appl. No. 13/729,604.
U.S. Office Action dated Jun. 12, 2020 in U.S. Appl. No. 13/729,604.
U.S. Office Action dated Nov. 30, 2020 in U.S. Appl. No. 13/729,604.
Google Scholar Search result of "appliance wifi setup" noted in Notice of Allowance for U.S. Appl. No. 13/729,606 dated Aug. 31, 2021.
U.S. Office Action, dated Sep. 18, 2020, in U.S. Appl. No. 16/701,572 (11 pp.).
Notice of Allowance, dated Mar. 11, 2021, in U.S. Appl. No. 16/701,572 (19 pp.).
U.S. Office Action dated Jun. 23, 2021 in U.S. Appl. No. 13/729,604.
Chirrareddy Sai Sankeerth Reddy et al., "Appliance Automation Using Li Fi with MOTT in Hybrid Star & Tree Network Setup", 2018 International Conference on Research in Intelligent and Computing in Engineering, 6 pages.
European Patent Office issued an Office Action and Response in European Application No. 12199442.0 dated Oct. 6, 2021.
Notice of Allowance issued in U.S. Appl. No. 17/365,406 dated Apr. 6, 2022.
Near Field Communication Network Services Jorma Ylinen; Mikko Koseka; Lari Iso-Anttila; 2009 Third International Conference on Digital Society Year: 2009 | Conference Pagerl Publisher: IEEE (Year: 2009).
U.S. Office Action dated Oct. 27, 2022 in U.S. Appl. No. 17/559,375.
U.S. Appl. No. 13/729,604, filed Dec. 28, 2012, Chang Ho Ha, et al., Samsung Electronics Co., Ltd.
U.S. Appl. No. 16/701,572, filed Dec. 3, 2019, Chang Ho Ha, et al., Samsung Electronics Co., Ltd.
U.S. Appl. No. 17/365,406, filed Jul. 1, 2021, Chang Ho Ha, et al., Samsung Electronics Co., Ltd.
U.S. Appl. No. 17/559,375, filed Dec. 22, 2021, Chang Ho Ha, et al., Samsung Electronics Co., Ltd.
Final Office Action dated May 12, 2023 issue in U.S Appl. No. 17/559,375.
Network configuration technique for home appliances KoonSeokLee; Suk Lee; Ki-Tae Oh; Seung-Myun Baek 2002 Digest of Technical Papers. International Conference on Consumer Electronics (IEEE Cat. No. 02CH37300 Year: 2002 | Conference Paper | Publisher: IEEE (Year: 2002) (Year: 2002).
Notice of Allowance dated Jul. 26, 2023 issued in U.S. Appl. No. 17/559,375.
Office Action dated Jul. 14, 2023 issued in European Application No. 18164354.5.
U.S. Appl. No. 17/559,375, filed Dec. 22, 2021, Chang Ho Ha, Samsung Electronics Co., Ltd.
Office Action dated Dec. 6, 2023 issued in U.S. Appl. No. 17/559,375.
Home Appliance Control from Mobile Phones Hiromitsu Sumino; Norihiro Ishikawa; Hirsohi Tsutsui; Hiroyuki Ochi; Yukichiro Nakamura; Yoshitaka Uchida Published in: 2007 $4^{th}$ IEEE Consumer Communications and Networking Conference (Year: 2007).

* cited by examiner

NETWORK SYSTEM OF HOME APPLIANCE AND NETWORK SETUP METHOD OF THE SAME

CROSS-REFERENCE TO RELATED APPLICATIONS

This application is a continuation application of U.S. patent application Ser. No. 17/559,375 filed on Dec. 22, 2021, which is a continuation application of U.S. patent application Ser. No. 17/365,406 filed on Jul. 1, 2021, now U.S. Pat. No. 11,412,557 issued Aug. 9, 2022, which is a continuation application of U.S. patent application Ser. No. 16/701,572 filed on Dec. 3, 2019, now U.S. Pat. No. 11,140,727 issued Oct. 5, 2021, which is a continuation application of U.S. patent application Ser. No. 13/729,604 filed on Dec. 28, 2012, now U.S. Pat. No. 11,219,072 issued Jan. 4, 2022, which claims the priority benefit of Korean Patent Application No. 10-2011-0144726, filed on Dec. 28, 2011, in the Korean Intellectual Property Office, the disclosures of which are incorporated herein by reference.

BACKGROUND

1. Field

Embodiments of the present disclosure relate to a network system of a home appliance configured to set up a network of a home appliance by using a terminal, and a network set-up method of the same.

2. Description of the Related Art

As the digital era is in full swing, home appliances, for example, a washing machine, a refrigerator, and an air conditioner, at an inside a household or a building are being replaced with high-speed, digital home appliances that are configured to transmit high-speed, high-quantity data, and thus a system configured to integrally manage a network that is built between the home appliances is being developed.

The network system being developed in recent years is configured to connect a plurality of home appliances to an outside service apparatus that is capable of integrally managing the plurality of home appliances, by use of a network that is built at an inside a building, thereby enabling data to be interchangeably transmitted/received between the plurality of home appliances and the outside service apparatus.

With respect to the network system, a WIFI (Wireless Fidelity) module is built in a home appliance, and a wireless access apparatus (access point: AP) configured to connect the home appliance to an outside Internet while being connected to the WIFI module is installed. Thus, the home appliance having built with the WIFI module is needed to access the AP in order to be connected with the outside Internet within a certain distance from which the AP is installed. According to the above, the home appliance having built with the WIFI module is needed to be provided with an input interface or a display apparatus configured to input/output a SSID (Service Set Identifier) and an authentication key to set up the WIFI.

However, with respect to most of the home appliances, since adding a sophisticated input/output apparatus, such as the input interface or the display apparatus, is difficult due to a reason such as cost, the input and the verification of the SSID, an authentication method, an encryption method, and an authentication key that are needed when setting up the WIFI may be difficult. In addition, since no input apparatus is present, the set-up value of the AP, the device information, and the device authentication key are needed to be stored at a Read-Only Memory (ROM) when mass-producing, thereby becoming vulnerable to hacking.

Other than the above, conventionally, when the home appliance is to be sold, the AP is needed to be provided to set up the WIFI. A user may need to purchase the AP separately in order to set up the network of the home appliance.

SUMMARY

Therefore, it is an aspect of the present disclosure to provide a network system of a home appliance capable of setting up a WIFI even without having an input/output apparatus, by converting the home appliance having built with a WIFI module into an AP, and then by enabling a terminal that supports the WIFI to be connected to the home appliance that is converted into the AP, and a network set-up method of the same.

Additional aspects of the disclosure will be set forth in part in the description which follows and, in part, will be apparent from the description, or may be learned by practice of the disclosure.

In accordance with an aspect of the present disclosure, a network system of a home appliance includes the home appliance, a terminal and a wireless access apparatus. The home appliance may be capable of a network. The terminal may be configured to transmit authentication information, which is needed to set up the network of the home appliance, to the home appliance without a user input by executing an application configured to set up the network of the home appliance. The wireless access apparatus may be configured to connect the home appliance to the terminal in a wireless manner through the network.

The home appliance may include a WIFI module.

The terminal may be configured to execute a WIFI set-up application, which is configured to set up the network of the home appliance, while being connected to the WIFI module.

The home appliance may further include an input unit. The input unit may be configured to select an access point (AP) conversion mode so that the terminal is connected to the home appliance without going through the wireless access apparatus.

The input unit may be configured to select the AP conversion mode by at least one button provided at the home appliance as an access point (AP) conversion button.

The network system may further include a control unit. The control unit may be configured to operate the home appliance as the wireless access apparatus when the AP conversion mode is selected.

When the home appliance is operated as the wireless access apparatus, the terminal may be configured to transmit network set-up information of the terminal to the home appliance without a user input, by use of the WIFI.

The terminal may include a near field communication (NFC) module.

When the terminal is placed within a range of the home appliance, the terminal may be configured to transmit network set-up information of the terminal to the home appliance without a user input, by use of a NFC communication.

The network set-up information may be information that is selected from a plurality of pieces of network set-up information being used at the terminal, and used as authentication information needed to set up the network of the home appliance.

The home appliance may be configured to be connected to the wireless access apparatus by using the network set-up information being transmitted from the terminal.

The home appliance may be connected to an outside Internet network through the WIFI module.

The terminal may include all devices capable of supporting WIFI.

In accordance with another aspect of the present disclosure, a method of setting a network of a home appliance comprising the home appliance capable of a network, a terminal to execute an application configured to set up the network of the home appliance, and a wireless access apparatus to connect the home appliance to the terminal in a wireless manner is as follows. An access point (AP) conversion mode may be selected so that the terminal is connected to the home appliance without going through the wireless access apparatus. The home appliance may be operated as an AP home appliance if the AP conversion mode is selected. Authentication information, which is needed to set up the network of the home appliance, may be transmitted from the terminal to the home appliance without a user input if the home appliance is operated as the AP home appliance. Setting up the network of the home appliance is completed by use of setting authentication information.

The home appliance may include a WIFI module.

The terminal may be configured to execute a WIFI set-up application, which is configured to set up the network of the home appliance, while being connected to the WIFI module.

The AP conversion mode may be a mode configured to operate the home appliance as the wireless access apparatus.

When the home appliance is operated as the wireless access apparatus, the terminal may select one of network set-up information being used at the terminal and transmit the selected network set-up information to the home appliance without a user input.

In accordance with another aspect of the present disclosure, a method of setting a network of a home appliance comprising the home appliance capable of a network, a terminal to execute an application needed to set up the network of the home appliance, and a wireless access apparatus to connect the home appliance to the terminal in a wireless manner is as follows. The terminal may be placed near at the home appliance. Authentication information, which is needed to set up the network of the home appliance, may be transmitted from the terminal to the home appliance without a user input. Setting up of the network of the home appliance may be completed by use of setting information.

The home appliance may include a WIFI module.

The terminal may include a near field communication (NFC) module, and may be configured to execute a WIFI set-up application, which is configured to set up the network of the home appliance, while being connected to the NFC module.

When the terminal is placed near the home appliance, the terminal may select one of network set-up information being used at the terminal, and transmit the selected network set-up information to the home appliance without a user input.

The wireless access apparatus may be connected to the WIFI module to connect the home appliance to an outside Internet network.

In accordance with the suggested network system and the network set-up method of the same, when connecting to an AP at a terminal, which is configured to support a WIFI, to use the terminal, after converting the home appliance having built with a WIFI module into an AP such that the terminal is connected to the AP home appliance, information stored at the terminal is transmitted to the AP home appliance, and thus the WIFI may be set up without a separate manipulation of a user at the time of setting up the WIFI of the home appliance. Thus, without adding an input/output apparatus such as a display apparatus or an input interface, the set-up value of the AP, the device information, and the device authentication key may be changed, and thus is safer from hack attacks, and when the home appliance is to be sold, an AP is not needed to be provided, and thus a cost-related advantage may be obtained.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
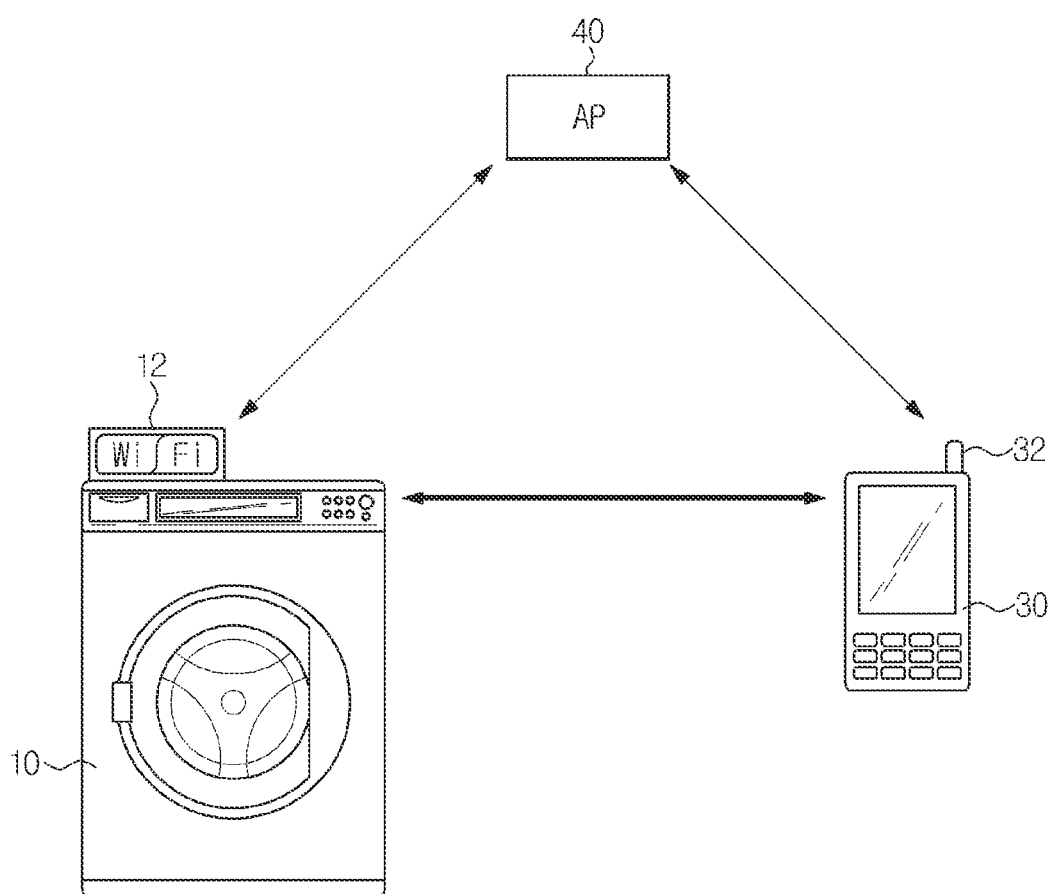
FIG. 1 is an overall view showing the configuration of a network system of a home appliance in accordance with an embodiment of the present disclosure.

Reference will now be made in detail to the embodiments of the present disclosure, examples of which are illustrated in the accompanying drawings, wherein like reference numerals refer to like elements throughout.

FIG. 1 is an overall a view showing the configuration of a network system of a home appliance in accordance with an embodiment of the present disclosure.

On FIG. 1, the network system of the home appliance includes a home appliance 10 having built with a WIFI module 12, a terminal 30 configured to execute an application to proceed with a WIFI set-up of the home appliance 10, and an wireless access apparatus (access point: AP) 40 configured to connect the home appliance 10 to an outside Internet network.

The home appliance 10 includes all of various electronic products, such as a washing machine, a refrigerator, a microwave, a TV, and an air conditioner, that are being used at a household in general, and by using the WIFI module 12 built at the home appliance 10, the home appliance 10 may be connected to an outside Internet network.

The terminal 30 is an apparatus connected to the WIFI module 12 built at the home appliance 10, and configured to execute an exclusive application (hereinafter called as an APP) to proceed with the WIFI set-up of the home appliance 10, and the terminal 30 includes all the devices that are capable of a WIFI support.

In addition, the terminal 30 is provided with a NFC (Near Field Communication) module 32 built thereto, and while being connected to the NFC module 32, may execute the application configured to proceed with the WIFI set-up of the home appliance 10.

The terminal 30 may be any electronic device capable of connecting to the wireless, wired, or wireless-wired hybrid network. The terminal 30 may include a smart phone, a PDA (personal digital assistant), a PMP (Portable Multimedia Player), a notebook, and a desktop computer. In addition, the terminal 30 includes a device, which is capable of carrying out various functions that use various application programs, such as a digital camera having cable/wireless communication functions, or a camcorder.

At the terminal 30, the application to proceed with the WIFI set-up of the home appliance 10 is installed, and another application may be installed at the terminal 30 additionally and utilized according to use. This application may be pre-installed or installed after downloading the application to the terminal 30. The application may be specific to the home appliance built by different manufactures or a standard application that may be used for any home appliance regardless of the manufacturer.

Further, the terminal 30 may be connected to an outside Internet network by using a secured communication protocol. At this time, at the outside Internet network that is being connected to the terminal 30, various communication links such as a ZigBee communications network, a WIFI communications network, a Bluetooth communications network, a mobile communications network, a LAN, a WAN, and a point-to-point telephone circuit connections may be used.

The AP 40 is configured to connect the home appliance 10 to an outside Internet network, as the AP 40 is connected to the WIFI module 12 built at the home appliance 10. The AP 40 is configured to connect the home appliance 10 having built with the WIFI module 12 to an outside Internet network within a range of the AP 40.

Figure 2:
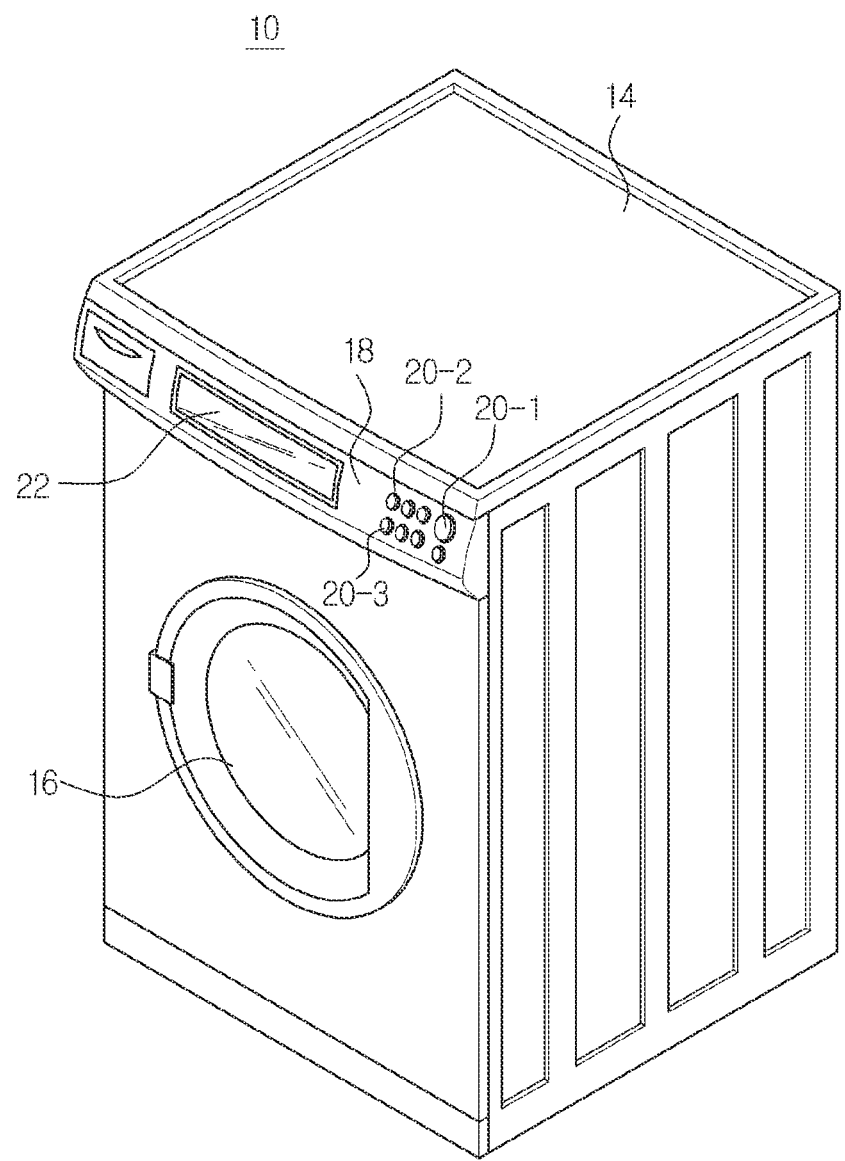
FIG. 2 is a drawing showing an example of the home appliance in accordance with an embodiment of the present disclosure.

FIG. 2 is a drawing showing an example of the home appliance in accordance with an embodiment of the present disclosure.

In FIG. 2, a washing machine, as a non-limiting example of the home appliance 10, is provided with a body 14 forming an exterior appearance of the washing machine, and is also provided with a door 16 installed at a front surface of the body 14 so that a laundry may be inserted into/withdrawn from.

In addition, at an upper portion of a front of the body 14, a control panel 18 at which various input units, and a display configured to control the home appliance 10 is provided. At the control panel 18, the input units may include various buttons 20-1, 20-2, and 20-3 configured to be received with a command of a user to control the operation of the home appliance 10, and a display unit 22 configured to display the operation state of the home appliance 10 and the manipulation state of a user is disposed. The input units may be a touch screen or wireless remote control. Certain buttons 20-2 and 20-3 among the various buttons 20-1, 20-2 and 20-3 disposed at the control panel 18 are being used as AP conversion buttons configured to convert the home appliance 10 into the AP 40. As an example, the buttons 20-2 and 20-3 may include a rinse button and a spin button, respectively.

Figure 3:
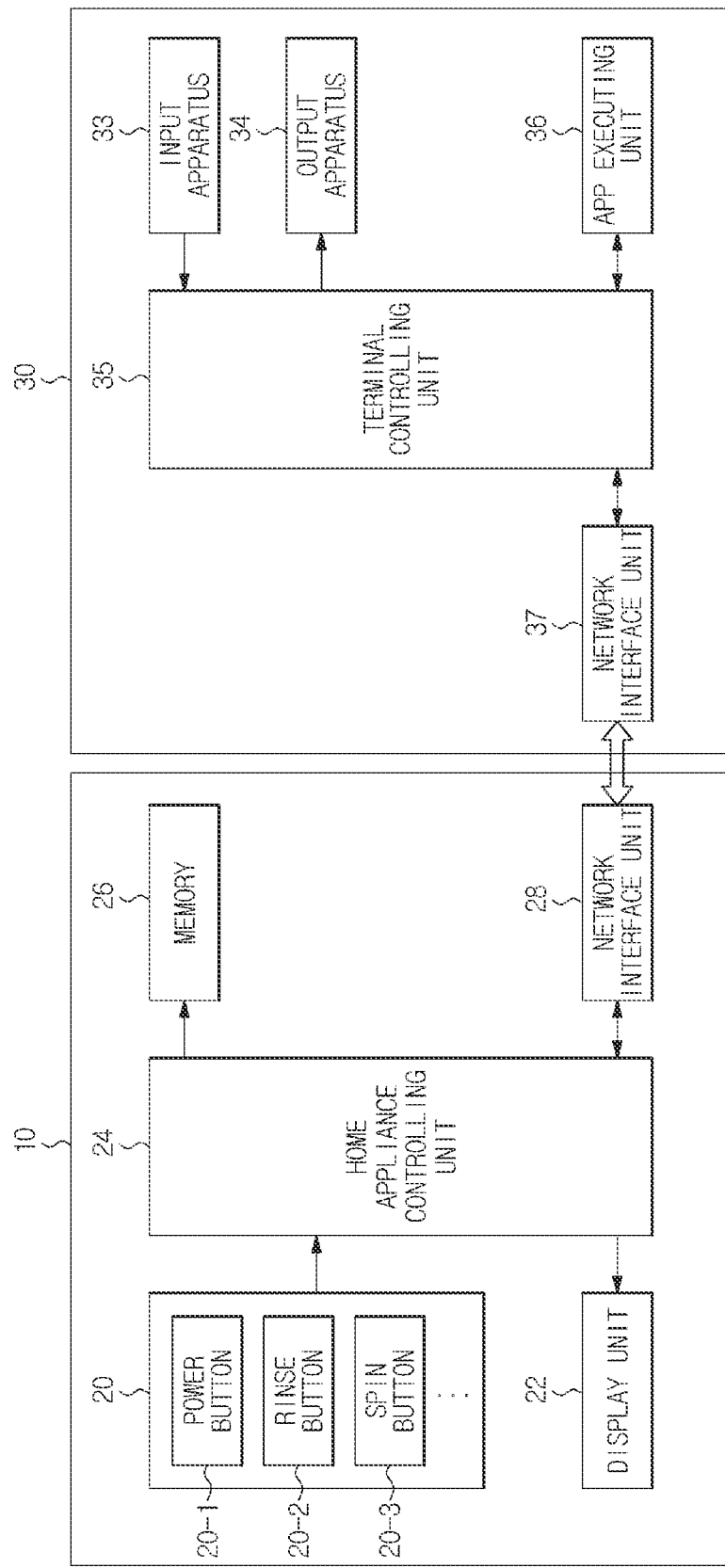
FIG. 3 is a block diagram showing a configuration of the network system of the home appliance in accordance with an embodiment of the present disclosure.

FIG. 3 is a view showing a configuration of the network system of the home appliance in accordance with an embodiment of the present disclosure.

In FIG. 3, the home appliance 10 having built with the WIFI module 12 includes an input unit 20, the display unit 22, a home appliance controlling unit 24, a memory 26, and a network interface unit 28.

The input unit 20 is configured to input a command to select the AP conversion mode of the home appliance 10 by the manipulation of a user, and may include a key, a button, a switch, and a touchpad. The input unit 20 includes all the apparatuses that generate predetermined input data by the manipulations such as pushing, contacting, pressing, and rotating.

The display unit 22 is configured to display the operation state of the home appliance 10 and the manipulation state of a user, for example, as a 7-segment and a LED, according to a display controlling signal of the home appliance controlling unit 24. As shown above, the input unit 20 and the display unit 22 may be integrated into one device, such as a touch screen unit for a user to input.

The home appliance controlling unit 24 represents a microcomputer configured to control overall operations of the home appliance 10, and when the AP conversion mode is selected by the input unit 20, the home appliance controlling unit 24 operates the WIFI module 12 built at the home appliance 10 in an AP mode. According to the above, the terminal 30 is AP-connected to the home appliance 10, which is converted into the AP mode, and by transmitting WIFI set-up information stored at the terminal 30 to the AP home appliance 10, the WIFI set-up of the home appliance 10 is taken place without a separate user manipulation.

The home appliance controlling unit 24, after enabling the terminal 30 to be AP-connected to the home appliance 10 by having the home appliance 10 to be operated as the AP, when the home appliance 10 makes access to the AP 40, by selecting one set-up information from the AP set-up information being used at the terminal 30, the information needed to set up the WIFI of the home appliance 10 is set up at the home appliance 10 without a user having to reenter the information needed to set up the WIFI of the home appliance 10. The information needed to set up the WIFI of the home appliance 10 may include a SSID, an authentication method, an encryption method, and an authentication key is.

In addition, with respect to the home appliance controlling unit 24, when the terminal 30 having built with the NFC module, when the terminal 30 is placed within a range of the home appliance 10, the terminal 30 is AP-connected to the home appliance 10. Thus, by transmitting the WIFI set-up information stored at the terminal 30 to the AP home appliance 10, the home appliance controlling unit 24 controls in a way that the WIFI set-up of the home appliance 10 may be taken place without a separate manipulation by a user.

The home appliance controlling unit 24, after enabling the terminal 30 having built with the NFC module 32 to be AP-connected to the home appliance 10 by placing the terminal 30 having built with the NFC module 32 within the range of the home appliance 10, when the home appliance 10 is connected to the AP 40, by selecting one set-up information from the AP set-up information being used at the terminal 30, the information such as a SSID, an authentication method, an encryption method, and an authentication key, to set up the WIFI of the home appliance 10 is set up at the home appliance 10 without a user having to reenter the information needed to set up the WIFI of the home appliance 10.

The memory 26 is configured to store at least one device information that includes product information of the home appliance 10 to set up the WIFI of the home appliance 10, and includes a data storage such as a ROM or a EEPROM. The memory may be any non-volatile type memory to retain stored information even when not powered.

In addition, at the memory 26, control data configured to control the operation of the home appliance 10, reference data being used while controlling the operation of the home appliance 10, operation data that is generated while the home appliance 10 performs a predetermined operation, operation information such as set-up data being input by the input unit 20 for the home appliance 10 to perform a predetermined operation, the frequency of a particular operation being performed by the home appliance 10, usage information having the model information of the home appliance 10, and error information having the diagnosis data with respect to the cause of the malfunction or the malfunction position when the malfunction of the home appliance occurs.

The network interface unit 28 allows the home appliance 10 to be in a network connection with the terminal 30 so that the home appliance 10 may network-communicate with the terminal 30 through a WIFI. The network interface unit 28 may be able to display a message, which indicates the state of transmitting the WIFI set-up information of the terminal 30 by the control of the home appliance controlling unit 24, through the display unit.

In addition, the terminal 30 that includes the network system includes an input apparatus 33, an output apparatus 34, a terminal controlling unit 35, an APP executing unit 36, and a network interface unit 37.

The input apparatus 33 is configured to input a command to select the information to be set up at the home appliance 10 by the manipulation of a user, and may include a key, a button, a switch, and a touchpad, while the input apparatus 33 includes all the apparatuses that generate predetermined input data by the manipulations such as pushing, contacting, pressing, and rotating.

The output apparatus 34 represents a display panel provided at the terminal 30, and is configured to display the current state screen of the terminal 30 or various set-up screen by receiving the control of the terminal controlling unit 35. The display may be any type of screen to display information to a user and may include a flat screen panel. The display panel may be implemented by a LCD (Liquid Crystal Display), LED (Light Emitting Diode), OLED (Organic Light Emitting Diode) and a PDP (Plasma Display Panel).

The terminal controlling unit 35 represents a microcomputer configured to control overall operations of the terminal 30, and when the information to be set up at the home appliance 10 is selected by the input apparatus 33 among the AP set-up information being used at the terminal 30, the terminal controlling unit 35 controls in a way that the information that a user is selected, such as the SSID, the authentication method, the encryption method, and the authentication key, is transmitted to the home appliance 10 by executing the APP.

The APP executing unit 36 is configured to execute the APP configured to automatically set up the WIFI, and the APP is executed at the terminal 30 so that the network set-up of the home appliance 10 is proceeded.

The network interface unit 37 allows the home appliance 10 to be in a network connection with the terminal 30 so that the home appliance 10 may network-communicate with the terminal 30 through a WIFI or a NFC communication. The network interface unit 37 may be able to display the message, which indicates the state of transmitting the network set-up information of the terminal 30 by the control of the terminal controlling unit 35, through the output apparatus 34.

Hereinafter, the network system of the home appliance shown as the above, and the operation process and the reaction effect of the network set-up method of the same will be described.

Figure 4:
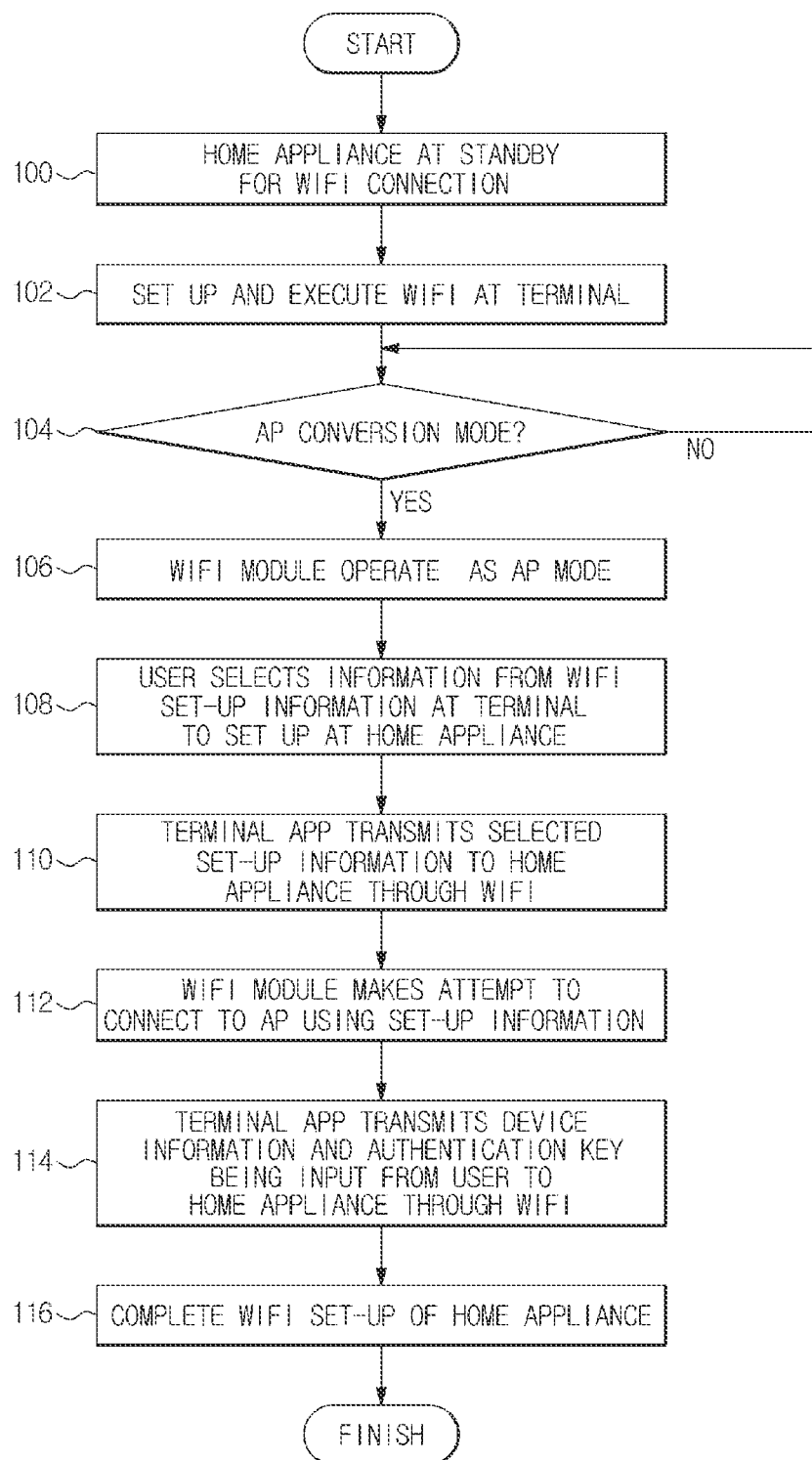
FIG. 4 is a flow chart showing a method of setting up a network by using a terminal that supports a WIFI at the network system of the home appliance in accordance with an embodiment of the present disclosure.

FIG. 4 is a flow chart showing a method of setting up a network by using a terminal that supports a WIFI at the network system of the home appliance in accordance with an embodiment of the present disclosure.

In FIG. 4, the home appliance 10 having built with the WIFI module 12 is at standby for a WIFI connection (100). The terminal 30 executes an automatic set-up APP that is configured to proceed with the set-up of the WIFI of the home appliance 10 (102).

After the above, a user selects an AP conversion mode to proceed with the set-up of the WIFI of the home appliance 10 by using the terminal 30 that supports the WIFI (104).

In an embodiment, the description with respect to selecting the AP conversion mode is made in relation that the AP conversion buttons 20-2 and 20-3 which are the RINSE button 20-2 and the SPIN button 20-3. The selection of the AP conversion mode is achieved in a way to pushing the RINSE button 20-2 and the SPIN button 20-3 simultaneously for a certain period of time, that is, approximately 3 to 4 seconds, so that the AP mode may be performed. Although in an embodiment, as a non-limiting example, the AP conversion mode is made by using the RINSE button 20-2 and the SPIN button 20-3, the present disclosure is not limited thereto. For example, the separate button dedicated to the AP conversion may be provided to the home appliance 10 or any combination of the buttons may be used to invoke the AP conversion mode. In addition, when the input unit is a touch screen, a graphical interface such as an icon may be used for the AP conversion mode.

As the AP conversion mode is selected, the home appliance controlling unit 24 operates the WIFI module 12 built at the home appliance 10 as an AP mode (106).

Thus, a user selects information that is to be set up at the home appliance 10 from WIFI set-up information being used at the terminal 30 (108), and the APP installed at the terminal 30 transmits the selected set-up information, such as the SSID, the authentication method, the encryption method, and the authentication key, to the home appliance 10 through the WIFI (110).

As the above, as the set-up information that a user selects is transmitted by the terminal APP to the home appliance 10, the WIFI module 12 built at the home appliance 10 makes an attempt to connect to the AP 40 by using the set-up information that is transmitted from the terminal 30 (112).

At this time, when an encryption is not set up at the home appliance 10, the terminal APP transmits device information and device authentication key that are being input from the user to the home appliance 10 through the WIFI (114).

As a result of the above, the set-up of the WIFI of the home appliance 10 is completed (116). In addition, upon the completion of the WIFI set-up, a user selects the power, the set-up completion key, or the power-OFF within a certain period of time.

Figure 5:
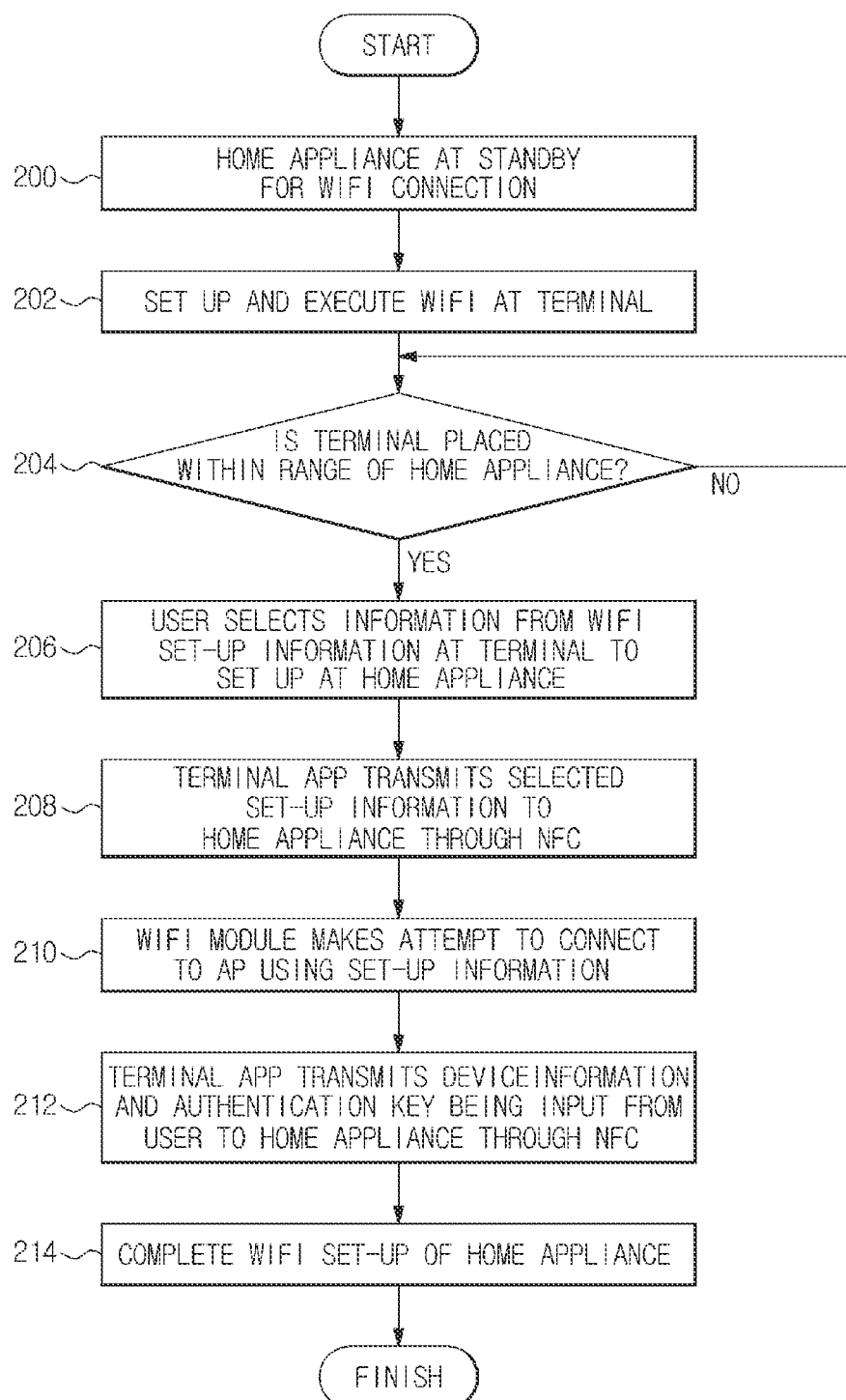
FIG. 5 is a flow chart showing a method of setting up a network by using a terminal having built with a NFC module at the network system of the home appliance in accordance with an embodiment of the present disclosure.

FIG. 5 is a flow chart showing a method of setting up a network by using the terminal 30 having built with the NFC module 32 at the network system of the home appliance in accordance with an embodiment of the present disclosure.

In FIG. 5, the home appliance 10 having built with the WIFI module 12 is at standby for the WIFI connection (200), and the terminal 20 executes an automatic set-up APP that is configured to proceed with the set-up of the WIFI of the home appliance 10 (202).

In addition, with respect to the home appliance controlling unit 24, When the terminal 30 having built with a NFC module, when the terminal 30 is placed within the range of the home appliance 10, the terminal 30 is AP-connected to the home appliance 10. Thus, by transmitting WIFI set-up information stored at the terminal 30 to the AP home appliance 10, a control operation is performed in a way that the WIFI set-up of the home appliance 10 may be taken place without a separate manipulation by a user.

The home appliance controlling unit 24, after enabling the terminal 30, having loaded with the NFC module 32, to be AP-connected to the home appliance 10 by placing the terminal 30 within the range of the home appliance 10, when the home appliance 10 is connected to the AP 40, by selecting one set-up information from the AP set-up information being used at the terminal 30, the information such as a SSID, an authentication method, an encryption method, and an authentication key, to set up the WIFI of the home appliance 10 is set up at the home appliance 10 without a user having to reenter the information needed to set up the WIFI of the home appliance 10.

After the above, a user places the terminal 30 having built with the NFC module 32 within the range of the home appliance 10 (204).

As the terminal 30 having built with the NFC module 32 is placed within the range of the home appliance 10, the terminal 30 and the home appliance 10 starts the NFC communication.

Thus, a user selects the information that is to be set up at the home appliance 10 from the WIFI set-up information being used at the terminal 30 (206), and the APP installed at the terminal 30 transmits the selected set-up information, such as the SSID, the authentication method, the encryption method, and the authentication key, to the home appliance 10 through the NFC communication (208).

As the above, as the set-up information that a user selected is transmitted by the terminal APP to the home appliance 10, the WIFI module 12 built at the home appliance 10 makes an attempt to connect to the AP 40 by using the set-up information that is transmitted from the terminal 30 (210).

At this time, when an encryption is not set up at the home appliance 10, the terminal 30 APP transmits device information and device authentication key that are being input from the user to the home appliance 10 through the NFC communication (212).

As a result of the above, the set-up of the WIFI of the home appliance 10 is completed (214).

As the above, in a conventional method of setting up the WIFI of the home appliance 10, the input interface or the display apparatus configured to set up the WIFI is needed at the home appliance 10, but in the present disclosure, by using the terminal 30, the input is made possible without a separate manipulation of a user, and the AP set-up value or the device information, as well as the device authentication key are made possible to be changed.

Hereafter, referring to FIG. 6, the description will be made in relation to the operation after the home appliance 10 having built with the WIFI module 12 is set up to be connected to the AP 40 by using the terminal 30 capable of supporting the WIFI or by using the terminal 30 having built with the NFC module 32.

Figure 6:
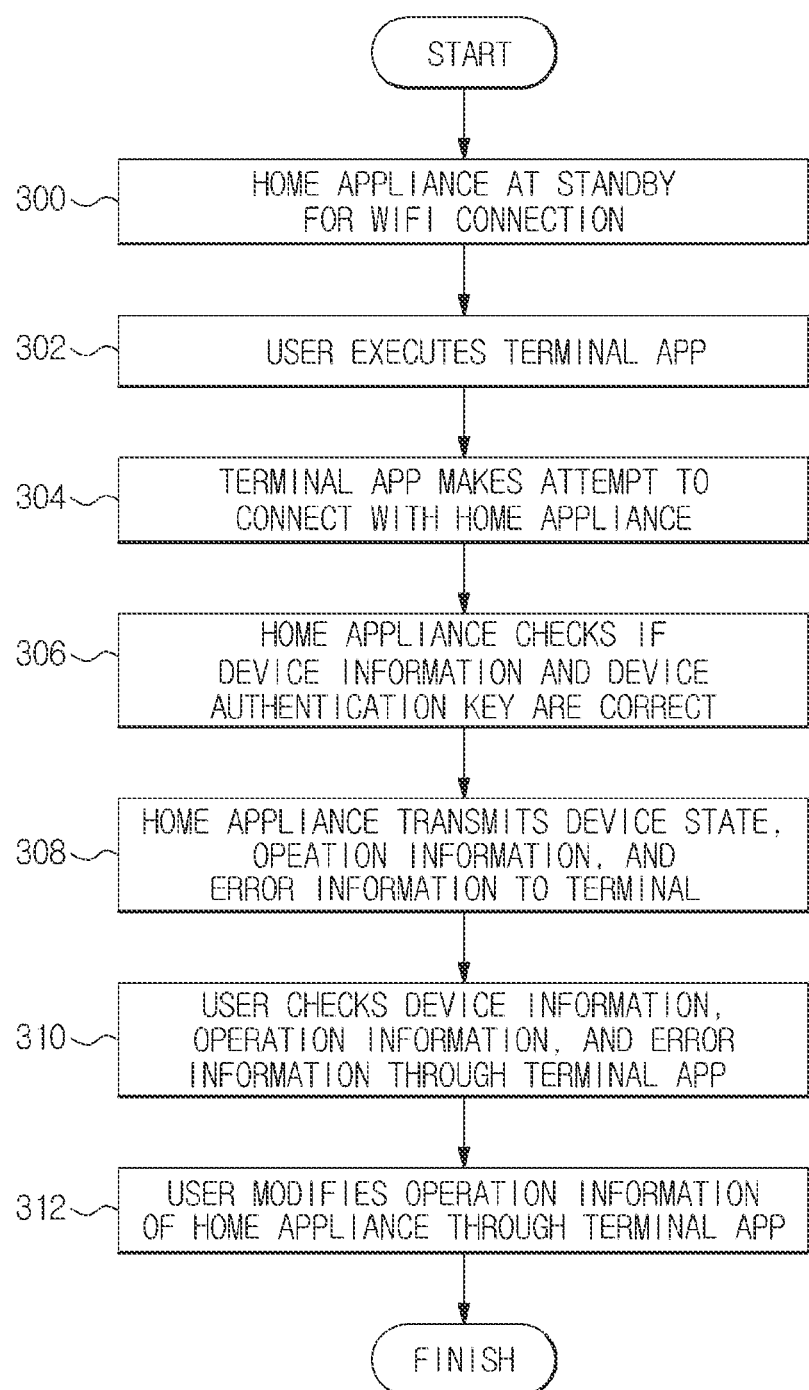
FIG. 6 is a flow chart showing a method of controlling the home appliance at the network system of the home appliance after the home appliance is set up to access a wireless access apparatus in accordance with an embodiment of the present disclosure.

FIG. 6 is a flow chart showing a method of controlling the home appliance at the network system of the home appliance after the home appliance is set up to be connected to the AP 40 in accordance with an embodiment of the present disclosure.

In FIG. 6, when the power of the home appliance 10 is ON, the home appliance 10 is at standby for the WIFI connection (300), and a user executes the APP at the terminal 30 (302).

Thus, the APP at the terminal 30 makes an attempt to be connected to the home appliance 10 through the WIFI or through the NFC communication (304), and the home appliance 10 checks that the device information and the device authentication key are correct (306).

After the confirmation is made at the home appliance 10 that the device information and the device authentication key are correct, the home appliance 10 transmits the device state, the operation information, and the error information to the terminal 30 (308).

Thus, a user may be able to checks and proceed with the device state, the operation information, and the error information of the home appliance 10 through the APP at the terminal 30 (310), and in addition, through the APP of the terminal 30, the operation information of the home appliance 10 may be modified, or the home appliance 10 may be turned OFF (312).

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A home appliance comprising:
    a communication circuitry configured to be operable in a first mode or in a second mode;
    an input unit including a button and configured to receive an input for controlling the home appliance; and
    at least one processor configured to:
    control the communication circuitry to operate in the first mode in response to detecting the button being pressed for a predetermined period of time;
    while the communication circuitry operates in the first mode, establish a first communication interface with an external terminal via the communication circuitry;
    obtain, via the first communication interface, network set-up information including a Service Set Identifier (SSID) of an external wireless access point apparatus and authentication information to access the external wireless access point apparatus, wherein the SSID is selected via the external terminal and the authentication information was previously stored in the external terminal;
    control the communication circuitry to operate in the second mode;
    while the communication circuitry operates in the second mode, establish a second communication interface with the external wireless access point apparatus using the obtained network set-up information; and
    control the communication circuitry to access an external server via the second communication interface.

2. The home appliance of claim 1, wherein the network set-up information is transmitted from the external terminal which is executing an application for setting up a network of the home appliance.

3. The home appliance of claim 2, wherein the at least one processor is further configured to, while the communication circuitry operates in the second mode, obtain a control command through the communication circuitry from the external terminal which is executing the application.

4. The home appliance of claim 1, wherein the network set-up information is transmitted in response to a selection of the SSID of the external wireless access point apparatus on the external terminal without further requesting an input of the authentication information in the external terminal.

5. The home appliance of claim 4, further comprising a display configured to indicate an operation state of the communication circuitry, and
wherein the at least one processor is further configured to indicate, on the display, that an operation state of the communication circuitry is in the first mode.

6. The home appliance of claim 1, wherein the SSID is selected at the external terminal while the first communication interface is established and the authentication information was stored in the external terminal before the first communication interface is established.

7. The home appliance of claim 1, further comprising a memory, and
wherein the at least one processor is further configured to store the obtained network set-up information in the memory, and
after storing the network set-up information, control the communication circuitry to operate in the second mode.

8. A method for establishing a connection of a home appliance with an external wireless access point apparatus, the method comprising:
detecting a button of the home appliance being pressed for a selected period of time;
operating a communication circuitry of the home appliance in a first mode in response to the detecting;
while the communication circuitry operates in the first mode:
connecting, via the communication circuitry, directly to an external terminal; and
obtaining network set-up information including a Service Set Identifier (SSID) of the external wireless access point apparatus and authentication information to access the external wireless access point apparatus which were previously used to make a connection between the external terminal and the external wireless access point apparatus and stored in the external terminal; and
operating the communication circuitry in a second mode; and
while the communication circuitry operates in the second mode:
connecting, via the communication circuitry, to the external wireless access point apparatus using the obtained network set-up information; and
operating the communication circuitry to access an external server via the external wireless access point apparatus.

9. The method of claim 8, wherein the network set-up information is transmitted from the external terminal which executes an application to establish communication of the home appliance.

10. The method of claim 8, wherein the network set-up information is transmitted in response to a selection of the SSID of the external wireless access point apparatus on the external terminal without further requesting an input of the authentication information in the external terminal.

11. The method of claim 10, further comprising:
displaying, on a display of the home appliance, that an operation state of the communication circuitry is in the first mode.

12. The method of claim 9, wherein the authentication information is stored in the external terminal before the external terminal connects to the home appliance.

13. The method of claim 8, further comprising:
storing the obtained network set-up information in a memory of the home appliance, and
wherein the communication circuitry is controlled to operate in the second mode after the network set-up information is stored in the memory.

* * * * *